United States Patent [19]

Dauvergne

[11] Patent Number: 5,037,601

[45] Date of Patent: Aug. 6, 1991

[54] GLASS-POOL, GAS-CYCLE NUCLEAR POWER PLANT

[76] Inventor: Hector A. Dauvergne, 419 E. Merle Ct., San Leandro, Calif. 94577

[21] Appl. No.: 571,328

[22] Filed: Aug. 23, 1990

[51] Int. Cl.[5] .......................... G21C 1/30; G21C 3/54

[52] U.S. Cl. .................................... 376/172; 376/181; 376/359; 376/293; 376/265; 376/272; 376/381; 376/294; 376/353; 376/391

[58] Field of Search ............... 376/347, 359, 381, 293, 376/294, 511, 287, 181, 265, 353, 272, 391

[56] References Cited

U.S. PATENT DOCUMENTS

| | | | |
|---|---|---|---|
| 3,296,082 | 1/1967 | Lemesle et al. | 376/287 |
| 3,494,829 | 2/1970 | Mialki et al. | 376/359 |
| 4,032,402 | 6/1977 | Horner et al. | 376/295 |
| 4,313,795 | 2/1982 | Dauvergne | 376/280 |
| 4,382,908 | 5/1983 | Petersen | 376/29 |
| 4,497,768 | 2/1985 | Caldwell et al. | 376/157 |
| 4,777,012 | 10/1988 | Schöning et al. | 376/287 |
| 4,863,676 | 9/1989 | Helm et al. | 376/299 |

*Primary Examiner*—Harvey E. Behrend
*Assistant Examiner*—Meena C. Helltah
*Attorney, Agent, or Firm*—Bielen, Peterson & Lampe

[57] ABSTRACT

A nuclear power plant that is of a walk-away type with an encapsulated reaction core in a glass matrix pool having a reactive Thorium/$U^{233}$ composition in a containment structure that radiates thermal energy for use in a closed gas cycle with a split path having a common compressor with an output that divides into a first path communicating with the thermal source and a second path communicating with an intercooler, the two paths combining in a turbine with an expander that discharges to a common collector for return to the compressor.

19 Claims, 3 Drawing Sheets

GLASS-POOL, GAS-CYCLE NUCLEAR POWER PLANT

BACKGROUND OF THE INVENTION

The glass-pool, air-cycle nuclear power plant of this invention is designed as an isolated system that requires minimal monitoring and is of a "walk-away" type, that is, one that can be shut down and decommissioned without any external intervention other then the poisoning of the nuclear reaction. In such event, the containment structure that contains the glass matrix pool and reaction core solidifies into a glass solid that can remain in place or be removed to a storage site.

Recent disasters and near disasters in the operation of existing nuclear power plants of large size have required a reevaluation of the technology of nuclear power plant design. Far greater attention has been placed on power plants that are considered "passively-safe," that is, which do not require the intervention of an operator during a nuclear crisis in order to return the plant to a safe operating condition. The expense and complexity of current and future designs of light water reactor plants have required the nuclear industry to rethink its nuclear energy goals and have generated renewed interest in smaller, modular type plants that operate without the use of water as a coolant or as a steam generating medium. Renewed interest in more inherently safe designs such as liquid sodium systems, including static designs that do not require sodium pumps, such as that proposed in my prior patent, entitled "Nuclear Power Plant With On-Site Storage Capabilities," U.S. Pat. No. 4,313,795, issued Feb. 2, 1982. In that patent there is disclosed a nuclear reactor power plant having a gas cycle that utilizes superheated steam in its superheated state throughout the cycle. The use of a gas cycle reactor avoids a motive substance that must undergo a phase change. The use of a substance that has a phase change between liquid and gas, can typically result in emergency conditions. For example, when quantities of water contact high temperature core material the explosive reaction releases large volumes of contaminated steam. This is the heart of the traditional disaster scenario.

Operating the reactor core in the very material that is to constitute its entombment on decommissioning, provides an attractive safety feature that other plants of advanced design appear to lack. This feature can provide a attractive solution to the problem of decommissioning and disposal of reactor cores.

The use of new reactor fuel sources utilizing thorium/uranium$^{233}$ in encapsulated fuel pellets with neutron moderation and containment by graphite shells and casings, provides the basis for advanced designs of walk-away nuclear power plants that require little or no monitoring during the life of operation of the plants. By use of smaller modular systems that are standardized with lower power goals which do not include failure prone internal or external liquid circulation pumps, the goal of a passively-safe or a walk-away nuclear power plant can realistically be achieved.

One of the crucial problems facing the nuclear power industry in the United States is the fact that, all of the nuclear plants that have been constructed to date are different from one another. In addition to the huge capital cost, large scale, custom power plants cause difficulty in staffing and safe monitoring of plant operation. Furthermore, at the time of decommissioning, each plant must be considered as a separate entity for which a decommissioning plan must be devised that in many cases can result in decommissioning costs that exceed the original cost of construction.

With a lower ultimate power goal for each plant, the system design can be standardized. By simply multiplying the number of identical plants, any desired greater power capacity can be obtained. Given a substantial flexibility in power rating and design, small inexpensive plants under one megawatt can be placed in operation to test operating parameters over a larger number of units at minimal financial and safety risk. The glass-pool, aircycle, nuclear power plant described and claimed herein resolves many of the current problems in the design of a safe power plant that utilizes fissionable nuclear materials that will not adversely impact the environment during operation or after shut-down.

SUMMARY OF THE INVENTION

This invention relates to a nuclear power plant and in particular to a glass-pool, gas-cycle plant having a thorium/uranium$^{233}$ reactor in a glass matrix that is designed to constitute the heat dissipating core during operation, and, the inert tomb upon deactivation.

The nuclear power plant of this invention couples a safe thermal source with a safe conversion means for converting thermal energy of a nuclear reaction to useful power, for example, electricity. Because the design of the power plant is directed to lower power goals, the thermal energy can also be converted directly to mechanical work useable on-site, for example, in pumping irrigation water. The design concept is such that the plant can be operated in an isolated environment as a self-contained system that requires no external support to either monitor operations or respond to an emergency situation. Key to the isolated system concept is the combination of an energy core that is immersed in a glass matrix that provides a heat sink to allow operation of the core at maximum temperature with the molten pool becoming the entombment matrix on solidification. The glass matrix includes in its composition fertile thorium material that is reduced in proportion to inert silicates as the distance from the central fissile core increases. During nuclear reaction, the glass matrix is in a molten state with a viscosity that increases as the distance from the core increases. The core and glass pool are encapsulated in a containment structure that is of a neutron reflecting substance such as graphite. The containment structure has a thermally conductive casing that provides a heat exchange from the glass-pool, thermal sink to a closed-cycle gas system.

The other primary feature that insures the safety of the device is the use of a power extraction system that has a drive medium that does not undergo a phase change from liquid to gas. The use of a liquid to gas drive medium has been a significant contributor to the safety problems of prior art devices. In the preferred embodiment the gas is simply air. A unique divided cycle enables the effective use of air to comprise the motive force in an enclosed system. The unique, dual-path, air-cycle system utilizes a common compressor for each of two paths, with the compressor outlet coupled to a first path that communicates with the nuclear thermal source and a second path that communicates with an intercooler before being supplied to a turbine. Preferably, the compressed air from both sources drives a common turbine with the air from both sources combining in a common collector where the divergent temperatures are effectively moderated for return to the compressor.

The nuclear reaction is preferably accomplished by utilizing a thorium/$U^{233}$ breeding reaction in a glass matrix that on activation provides both a starting fissile material and a fertile feed material to continue a long term nuclear reaction preferably without the addition of more fuel. The life of the reaction can be determined at the time the plant is commissioned. At the time of decommissioning, when the fuel reaction is diminishing to the point that adversely affects the thermodynamic efficiency of the plant, the reduced-level, nuclear reaction is finally poisoned with a probe of a neutron absorbing material such as boron, allowing the glass matrix and core to cease reaction and gradually cool to a solid glass block. The entire core and encapsulation structure can either be removed for easy transportation as a vitrified solid to a central storage location, or can be entombed on site. If entombed on site, the volume of open space in the heat exchange area, between the pressure vessel and the encapsulation structure can be filled with a solidifying substance such as concrete, doped with a neutron absorber such that the outer containment structure totally entombs the decommissioned reactor capsule and shields any low level residual radiation that may be emitted from the core. These and other features of the preferred embodiment of this invention will be considered in greater detail in the detailed description of the preferred embodiments that follows.

DESCRIPTION OF THE PREFERRED EMBODIMENTS

Figure 1:
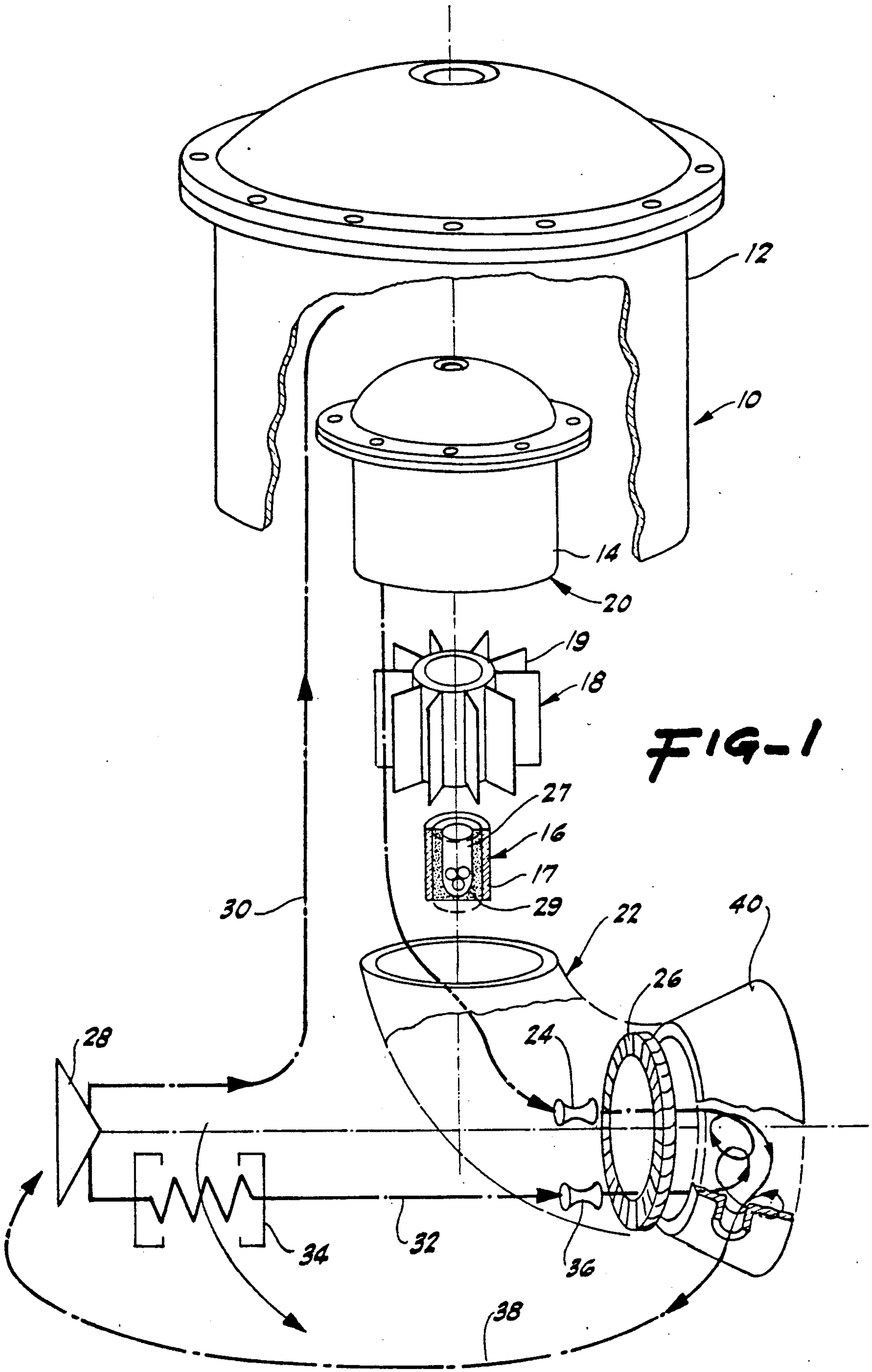
FIG. 1 is an exploded perceptive view of the glass-pool, air-cycle nuclear power plant of this invention.
Figure 2:
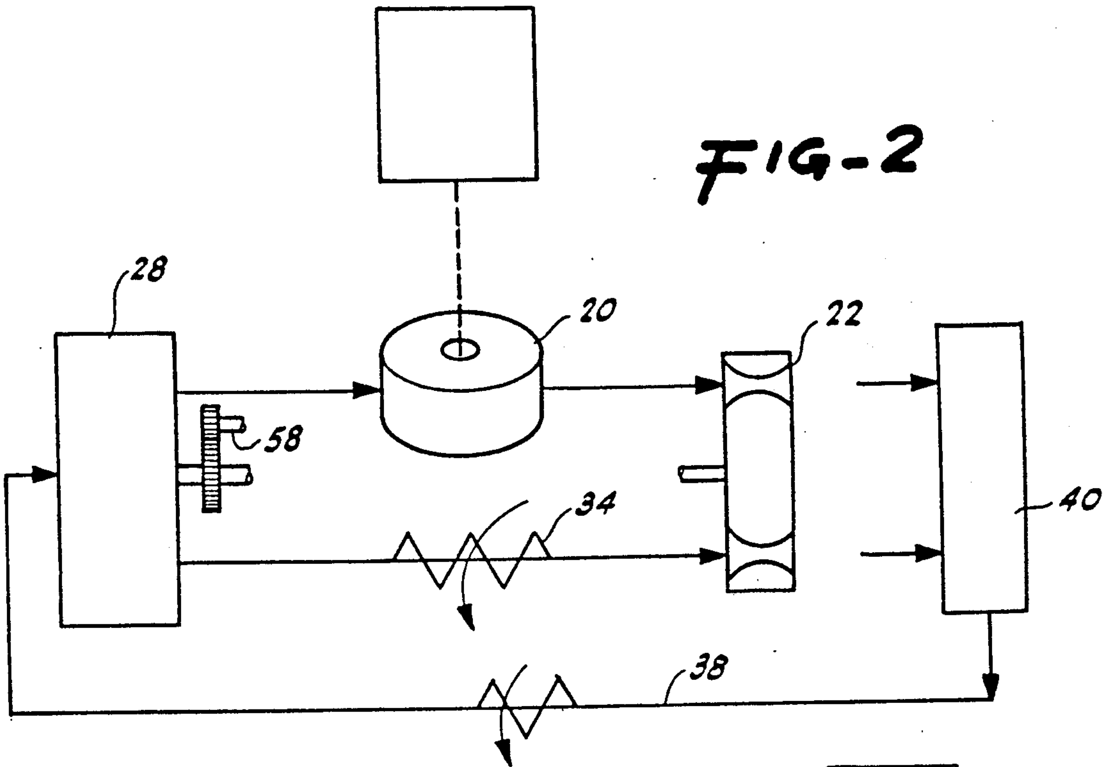
FIG. 2 is a diagrammatic schematic of the dual path air cycle and nuclear thermal source.

The glass-pool, air-cycle nuclear power plant of this invention is shown in the exploded view of FIG. 1 and is designated generally by the reference numeral 10. The power plant includes an outer containment structure 12 which houses an internal pressure vessel 14 that contains the reactor capsule 16 and heat exchange casing 18. The outer containment structure 12 is of sufficient size to control any escape of cycled gas that is under compression in the pressure vessel. It is to be understood that since the gas does not go through a phase change the size of the containment structure need only be of sufficient size to adequately contain at moderately low pressure, expanded gases from the volume of space between the pressure vessel 14 and the heat exchange casing. The pressure vessel and the heat exchange casing 18 form a heat exchange unit 20 which is coupled to a turbine 22 such that compressed and heated gases expand though one or more nozzles 24 to drive a rotor 26.

The air cycle path is schematically shown in FIG. 1 and comprises a closed cycle with a compressor 28 that receives expanded gases from the turbine 22 and compresses them to an operating pressure of approximately 150 psi. The discharge from the compressor 28 is split into two different paths 30 and 32. One path 30 delivers a portion of the discharge from the compressor to the heat exchange unit 20 and then to the turbine nozzle 24. The other path delivers the remaining portion of the discharge from the compressor to an intercooler 34. After cooling, the compressed and chilled air is past to a nozzle 36 for expansion though the turbine rotor 26.

Although the nozzles 24 and 36 are shown schematically in FIG. 1 it is to be understood that more sophisticated designs can be incorporated such as a circumferential housing having alternate hot and cold discharge nozzles that discharge into the rotor thereby maintaining the temperature of the rotor blades relatively low. Because of the temperature differential between the high temperature and low temperature gases, the violent mixing in an expansion chamber 40, subsequent to the expansion though the turbine 26, will result in cooling of the hot gases to a temperature that approaches ambient temperatures with a concomitant loss in velocity of the gases. The gases then can be returned as a homogenous low pressure, low temperature gas to the compressor via a common return path 38.

Figure 3:
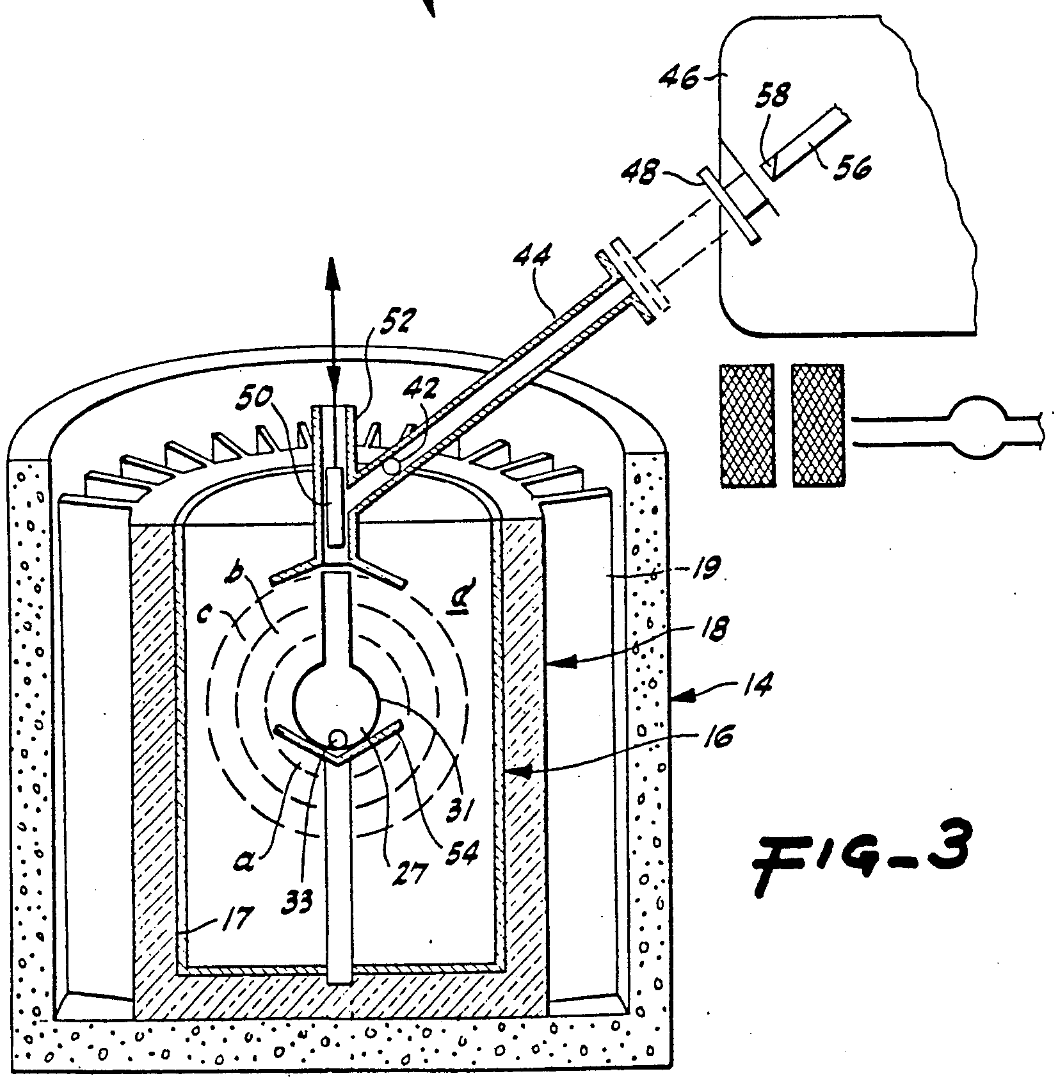
FIG. 3 is a cross-sectional view of the containment and the encapsulation system for the nuclear core.

Referring now to FIG. 3, a portion of the pressure vessel 14 is shown with the reactor capsule 16 and the heat exchange casing 18. The thick heat exchange casing 18 is a shell of a high temperature, highly conductive alloy material such as Inconel, which not only performs the function of a heat sink, but has radiating fins 19 for the transmission of thermal energy from the core 27, to the air passage between the heat exchange casing 18 and the outer wall of the pressure vessel 14. The heat exchange casing also provides a final shield to absorb any neutrons penetrating the reflective carbon inner shell 17 of the reactor capsule. Because of the low pressures involved, the outer wall of the pressure vessel 14 can be constructed from reinforced concrete with or without any shielding material.

The reactor capsule 16 comprises a glass matrix heat sink 29 having a staged silica and thorium oxide mix which diminishes from a central 50/50 mixture around the core 27 to a 25/75, 15/85 and finally all silica composition as shown in FIG. 3 by the notations a, b, c, and d respectively. In the central core 27, originally protected by a glass flask 31 is a cavity into which fuel balls 33 are deposited. Two alternatives are provided for initiating the fission reaction to convert the thorium to uranium and cause the $U^{233}$ to fission.

As shown in FIG. 3 fuel balls 33 are introduce by an external vehicle 46 on start-up and commissioning of the plant. The fuel balls may include fissionable $U^{235}$ material which on deposit of a critical mass of fuel balls will start a chain reaction and initiate fission in other fertile thorium balls. The fuel balls 42 are deposited though a feed pipe 44 that is coupled to the vehicle 46 by a retractable coupling pipe 48. A carbon plug 50 in a vertical tube 52 is retracted allowing the fuel ball 42 to drop to the glass flask 54. Upon deposit of the predetermined number of thorium and $U^{235}$ fuel balls to initiate a chain reaction, the moderator plug 50 is lowered into a blocking position to contain the thermal reaction and reflect emitted neutrons. The fissionable fuel balls melt the glass flask 54 and commence emitting neutrons to initiate the transformation of the thorium in the glass/-thorium matrix to a fissile material. The matrix eventually melts such that the core and sink glass become a molten mass.

Alternately, a safer means may be used to initiate a reaction. Relatively pure fuel balls of thorium$^{232}$ and a noncritical quantity of $U^{235}$ may be deposited through the feed pipe 44 with the plug 50 retracted. A photo neutron generating gun 56 with a magnetic deflector 58 at its end is inserted as a probe into the feed pipe 44 wherein an accelerator in the vehicle directs a photoneutron beam down the gun 56 to the deflector where the beam is deflected and directed at the uranium and thorium fuel in the flask. The gun activated neutron emissions to augment the uranium emitted neutrons to initiate fission and the breeding of fissionable $U^{233}$ from the thorium in the fuel balls and in the surrounding glass matrix.

A accelerator with a beam energy of 40 Me V would be required for the startup. The accelerator of this power level can be constructed for mounting in a trailer that can be moved from site to site for start-up of multiple nuclear plants of the type described.

Use of non-uranium target materials that will emit neutrons upon bombardment from an external photo neutron generating source is a preferred consideration for a safe start-up regime. A pure thorium start-up is discussed hereafter.

Power is extracted from the system as schematically shown in FIG. 3. The compressor 28 compresses air in a closed cycle. Cooled air is received through a return conduit 38 from a collector 40. The air is compressed to approximately 150 p.s.i. by the compressor 28. Part of the compressed air, approximately 80%, is cooled an intercooler 34 and the remaining portion is heated in the reactor or heat exchange unit 20. The hot stream and cold stream drive a turbine 22, which in turn drives the compressor 28 and the power take-off 58. The expanded gases discharged from the turbine 22 are collected in the expander-collector 40 and thermally equalized for return to the compressor. The equalization of temperature in the mixed air and further minor heat loss by radiation from the return conduit 38 returns the mixed air to the compressor at substantially ambient temperature. Alternately, an active heat exchanger can be incorporated to further cool high temperature gases after expansion whether before or after mixture in the collector.

The core 27 is permitted to operate at maximum temperature in excess of 4500° F. The temperature declines as the distance from the core increases with the outer portions of glass pool sink 29 reaching 3000° F. and the graphite shell 17 averaging 2800° F. The system is sized and charged with fissionable material to generate and maintain a surface temperature at the heat exchange casing of 2700° F., with an exit air flow temperature of 1700° F.

The combined expansion of the compressed and heated air and the compressed and cooled air will result in a mixed air in the collector 40 having an temperature approximating ambient temperature.

Although the cycle efficiency is only about 3–4 percent, once commissioned the relatively inexpensive charge of fuel should continue producing thermal energy for years.

Figure 4:
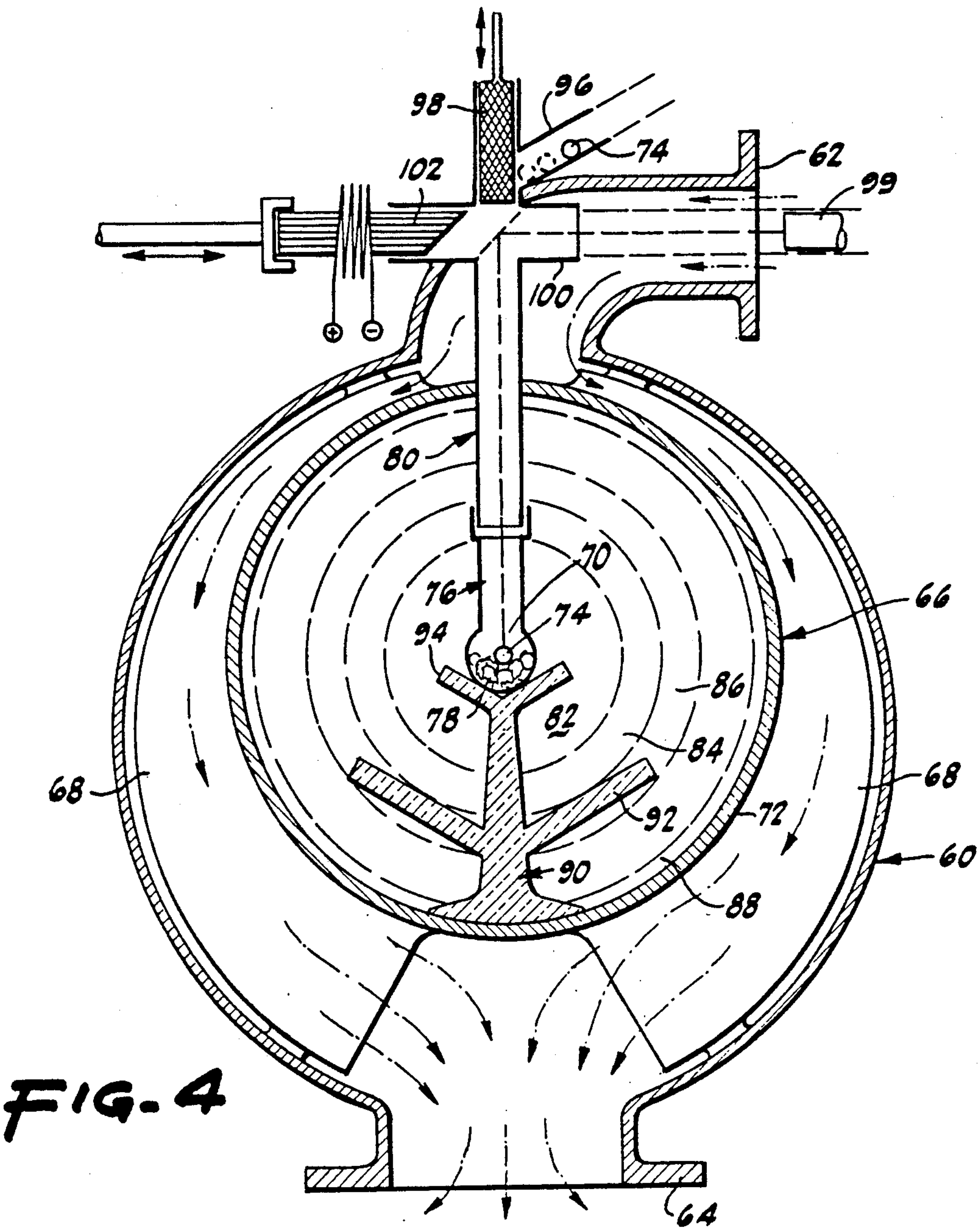
FIG. 4 is a cross-sectional view of an alternate embodiment for the containment and encapsulation systems for the nuclear core.
Figure 5:
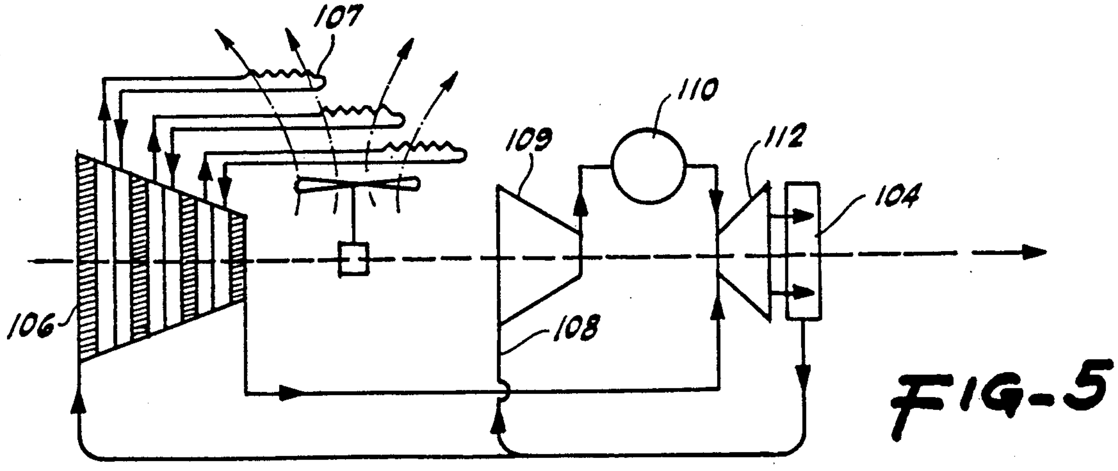
FIG. 5 is a diagrammatic schematic of an alternate embodiment of the dual path air cycle and nuclear thermal source.

An alternate embodiment of the invention is shown in FIGS. 4 and 5. Referring to FIG. 4, a modified pressure vessel for the nuclear power plant is shown. The pressure vessel 60 has an air intake flange 62 and a hot air outlet flange 64 for connecting to a compressor and turbine circuit as shown in FIG. 5. The pressure vessel 60 is generally spherical in shape to house a spherical reactor capsule 66 that is eccentrically situated in the vessel to enable inlet air to be heated by radial fins 68 of increasing surface area as the air passes from inlet to outlet. The spherical reactor capsule is designed to most efficiently radiate thermal energy from the fuel core 70 to the alloy heat exchange casing 72.

The fission is preferably initiated by deposit of pure thorium fuel balls 74 in a glass container 76 having an impact cushion 78 to prevent breakage during fueling. The glass container 76 is coupled to the end of a high temperature ceramic feed pipe 80 which remains after the glass container has melted on initiation of the reaction. The container 76 is encompassed by a thorium-glass matrix of diminishing thorium content. For example, the inner packing 82 has a 50-50, thorium/glass content, the next layer 84, a 25-75, thorium/glass content, and the outer packing 86 an all glass content. A graphite shell 88 provides a reflecting neutron shield.

The fuel balls 74 rest on a ceramic pedestal 90 having a secondary dish 92 to receive any fuel balls or heavy fissionables that overflow the top cradle 94 during operation.

Fission is preferably initiated by depositing a quantity of high-grade thorium fuel balls through a feed tube 96 with a control rod 98 retracted. The control rod 98 may be fabricated from a neutron absorbing composition such as a boron in a ceramic or Inconel matrix. The control rod 98 is designed to be irreversibly positioned in the reactor if dropped down the feed pipe 80 and into the molten glass matrix to poison the reaction. Ordinarily it is positioned in the upper portion of the feed pipe 80 unless further withdrawn to allow for feeding of additional fuel balls through the feed tube 96. The control rod 98 is also withdrawn on initiating reaction by clearing photoneutron path shown in broken line.

A horizontal probe (99) from a LINAC photoneutron generator connects with the guide conduit 100 and directs a photoneutron generating beam at an electromagnetic deflector 102 which is moved into position shown in dotted line, to deflect the beam at the fuel balls in the cone. The photoneutron generating beam stimulates the fuel balls to generate neutron emissions to initiate a fission reaction. The fertile thorium transforms to a fissile $U^{233}$ under bombardment by the photoneutron generating beam and the released neutrons of the stimulated mass.

As shown schematically in FIG. 5, an alternate closed air flow circuit cycles air from a collector or mixing chamber 104 to a multistage compressor 106 having an intercooler 107 between each stage for compression of air to the turbine operating pressure of 150 psig. A separate compressor 109 without intercooling also compresses a portion of the air from the collector via a bleed path 108 for delivery to the reactor heat exchanger 110 where the air is heated to at least 1700° F. before delivery to the turbine 112, which is the embodiment disclosed, accepts both the cold air from the intercooled compressor and the hot air from the reactor. The expanded air is mixed in the collector 104 where temperature and velocity are reduced for return to the cycle.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A glass pool nuclear reactor comprising:

an energy using means for utilizing thermal energy from the reactor;

a reactor capsule having a heat radiating outer shell and a neutron reflecting inner shell;

a fission core centrally located within the reactor capsule having a rich thorium/$U^{233}$ composition;

a glass pool, heat sink encompassing the core comprised of a glass and fertile thorium fuel matrix with a thorium content diminishing from the core to the inner shell of the reactor capsule; wherein, the glass and fertile fuel matrix is in a molten state during operation of the reactor and is in a solid state on termination of operation of the reactor.

2. The reactor of claim 1 wherein the outer shell of the reactor capsule has heat radiating fins.

3. The reactor of claim 2 having further a pressure vessel encompassing the reactor capsule the pressure vessel having an inlet and an outlet.

4. The reactor of claim 3 wherein the energy using means comprises a closed gas cycle, power plant, the plant having a gas compressor, a turbine connected to the compressor and a gas collector with return means for cycling gas from the turbine to the compressor and delivery means for delivering compressed gas from the compressor through the pressure vessel and to the turbine.

5. The reactor of claim 4 wherein the energy using means includes further, an intercooler and the delivery means includes bypass means for delivering part of the compressed gas from the compressor through the intercooler and to the collector wherein hot and cold gases discharged from the turbine are mixed.

6. The reactor of claim 5 wherein a majority of collected gas in the collector are returned to the intercooled compressor.

7. The reactor of claim 3 wherein the energy using means includes further, an intercooled compressor, wherein the intercooled compressor is a staged compressor with intercoolers after each stage and with delivery means for delivering compressed cool gas directly to the turbine wherein the return means includes a first return path from the gas collector to the gas compressor and a second path from the gas collector to the intercooled compressor.

8. The reactor of claim 7 wherein a majority of collected gas in the gas collector is returned to the intercooled compressor.

9. The reactor of claim 5 wherein the reactor capsule has a fuel supply conduit with a plug, and a core container means for receiving fuel balls from an external supply through the supply conduit.

10. The reactor of claim 9 wherein the fuel supply conduit includes means for insertion of a probe means for emitting a photoneutron generating beam to stimulate fission of fuel balls contained in the core container.

11. The reactor of claim 9, wherein the core contains fertile thorium fuel balls that are transformable to a fissionable material on stimulation by a photoneutron generating beam.

12. The reactor of claim 9 wherein the plug contains a neutron absorbing material that terminates fission and operation of the reactor when the plug is lowered into the core.

13. The reactor of claim 3 wherein the pressure vessel is contained within an outer containment structure.

14. The reactor of claim 1 wherein the reactor capsule is spherical in configuration.

15. The reactor of claim 3 wherein the pressure vessel is spherical in configuration.

16. The reactor of claim 1 wherein the reactor capsule is spherical in configuration and is contained within a spherical pressure vessel.

17. The reactor of claim 16 wherein the spherical pressure vessel has a geometric center displaced from the geometric center of the reactor capsule.

18. The reactor of claim 17 wherein the spherical reactor capsule has fins and the inlet and outlet are arranged such that the surface area of the fins increases as the gas passes from inlet to outlet.

19. The reactor of claim 4 wherein the energy using means uses air in the closed gas cycle.

* * * * *